United States Patent
Xu

(10) Patent No.: US 9,888,100 B2
(45) Date of Patent: Feb. 6, 2018

(54) FOLDABLE DISPLAY DEVICE

(71) Applicant: BOE TECHNOLOGY GROUP CO., LTD., Beijing (CN)

(72) Inventor: Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/321,107

(22) PCT Filed: Mar. 11, 2016

(86) PCT No.: PCT/CN2016/076120
§ 371 (c)(1),
(2) Date: Dec. 21, 2016

(87) PCT Pub. No.: WO2016/155479
PCT Pub. Date: Oct. 6, 2016

(65) Prior Publication Data
US 2017/0142240 A1  May 18, 2017

(30) Foreign Application Priority Data

Apr. 1, 2015 (CN) .......................... 2015 1 0151887

(51) Int. Cl.
*H04M 1/00* (2006.01)
*H04B 1/38* (2015.01)
(Continued)

(52) U.S. Cl.
CPC .......... *H04M 1/0216* (2013.01); *G09F 9/301* (2013.01)

(58) Field of Classification Search
CPC ..... G06F 1/1616; G06F 1/1652; H04M 1/021
(Continued)

(56) References Cited

U.S. PATENT DOCUMENTS

| 6,119,758 A | 9/2000 | Coenraets |
| 9,013,867 B2 * | 4/2015 | Becze ................... G06F 3/1438 361/679.01 |

(Continued)

FOREIGN PATENT DOCUMENTS

| CN | 1247618 A | 3/2000 |
| CN | 103034293 A | 4/2013 |

(Continued)

OTHER PUBLICATIONS

Chinese First Office Action for Chinese Application No. 201510151887.9, dated Nov. 30, 2016, 7 Pages.
(Continued)

*Primary Examiner* — Simon Nguyen
(74) *Attorney, Agent, or Firm* — Brooks Kushman P.C.

(57) ABSTRACT

The present disclosure relates to a foldable display device, including: first and second housings, which are hinged through a first shaft and have first and second closed surfaces respectively and which are capable of rotating about the first shaft to be open or closed; and a touch screen covering the first and second closed surfaces. The touch screen has a bendable region corresponding to a connection region for the first and second housings, the bendable region presenting a planar structure when the first and second housings are open and presenting a smooth curved structure when the first and second housings are closed. A first groove is defined in an end of the first housing neighboring the second housing, and a second groove is defined in an end of the second housing neighboring the first housing. The first and second grooves together define an accommodation space for accommodating the bendable region.

12 Claims, 2 Drawing Sheets

(51) Int. Cl.
*H04M 1/02* (2006.01)
*G09F 9/30* (2006.01)

(58) Field of Classification Search
USPC ............ 455/566, 575.3; 361/679.06, 679.27
See application file for complete search history.

(56) References Cited

U.S. PATENT DOCUMENTS

| | | | |
|---|---|---|---|
| 9,235,239 B2* | 1/2016 | van Dijk | G06F 1/1652 |
| 9,250,733 B2* | 2/2016 | Lee | H04M 1/02 |
| 2012/0307472 A1* | 12/2012 | Bohn | G06F 1/1616 |
| | | | 361/807 |
| 2013/0342090 A1 | 12/2013 | Ahn et al. | |
| 2013/0342094 A1* | 12/2013 | Walters | G09F 19/00 |
| | | | 312/319.2 |
| 2014/0042293 A1* | 2/2014 | Mok | G06F 1/1652 |
| | | | 248/682 |
| 2014/0328041 A1* | 11/2014 | Rothkopf | H04M 1/0216 |
| | | | 361/807 |
| 2015/0257289 A1* | 9/2015 | Lee | H05K 5/0017 |
| | | | 361/749 |
| 2016/0070303 A1* | 3/2016 | Lee | G06F 1/1616 |
| | | | 361/679.27 |

FOREIGN PATENT DOCUMENTS

| | | |
|---|---|---|
| CN | 103106845 A | 5/2013 |
| CN | 203014919 U | 6/2013 |
| CN | 103294113 A | 9/2013 |
| CN | 104506688 A | 4/2015 |
| CN | 104836865 A | 8/2015 |

OTHER PUBLICATIONS

International Search Report and Written Opinion for Application No. PCT/CN2016/076120, dated May 25, 2016, 13 Pages.

* cited by examiner

FOLDABLE DISPLAY DEVICE

CROSS-REFERENCE TO RELATED APPLICATIONS

This application is the U.S. national phase of PCT Application No. PCT/CN2016/076120 filed on Mar. 11, 2016, which claims priority to Chinese Patent Application No. 201510151887.9 filed on Apr. 1, 2015, the disclosures of which are incorporated in their entirety by reference herein.

TECHNICAL FIELD

The present disclosure relates to a mobile phone, in particular to a foldable display device.

BACKGROUND

With the rapid development of smart phones and the mobile internet, people are no longer satisfied with ordinary smart phones. Large-screen phones play a very good role in improving the user experience and visual effects, especially in making business communication, playing games, etc. more convenient. However, under normal circumstances, the enlargement of the phone's screen directly results in a larger body, which is not easy to carry.

In related arts, an approach for solving the above-mentioned problem is to use a foldable phone, which includes two housings that can be expanded and folded. Displays may be provided on the two housings. When the mobile phone is expanded, the displays on the two housings combine into a large display as a whole. However, since the large display is formed by connecting the two separate displays, the display effect is poor.

In related arts, another approach for solving the above-mentioned problem is to directly arrange a large display on the two housings of the foldable display device. The large display can be folded and expanded with the flipping closed and open of the two housings. However, when the phone is closed, a large angle of bending occurs to the large screen, which may easily lead to the breakage of the large screen, thereby shortening the service life.

SUMMARY

An object of the present disclosure is to provide a foldable display device, so as to achieve bending of a screen with a larger radius, thereby extending the service life.

In order to achieve the above object, the present disclosure provides a foldable display device, including: a first housing and a second housing which is hinged to the first housing with a first shaft; wherein the first housing has a first closed surface and the second housing has a second closed surface; and the first housing and the second housing is capable of rotating about the first shaft to be open or closed; and a touch screen covering the first closed surface and the second closed surface. The touch screen has a bendable region corresponding to a connection region for the first housing and the second housing. The bendable region presents a planar structure when the first housing and the second housing are open and presents a smooth curved structure when the first housing and the second housing are closed. A first groove is defined in an end of the first housing neighboring the second housing, a second groove is defined in an end of the second housing neighboring the first housing, and the first groove and the second groove are aligned and joint to define an accommodation space for accommodating the bendable region.

Further, a structure of the first groove and a structure of the second groove are symmetrical with respect to the first shaft.

Further, the first groove is defined by: a first sidewall, neighboring the first shaft and having a curved structure; and a second sidewall, defining an acute angle with respect to the first closed surface and having a side away from the first closed surface being connected to a bottom side of the first sidewall.

Further, the foldable display device further includes: a first barrier plate in the first groove; and a first movement structure configured to control movement of the first barrier plate between a first position and a second position. The first barrier plate is at the first position where an opening of the first groove is and the first barrier plate is in a same plane as the first closed surface, when the first housing and the second housing are open. The first barrier plate is at the second position when the first housing and the second housing are closed, the second position is in a second portion other than a first portion in the first groove, and the first portion in the first groove is configured to accommodate the bendable region.

Further, the first movement structure includes: a second shaft at the opening of the first groove and at an end of the opening away from the first shaft; wherein a first end of the first barrier plate is hinged on the second shaft; and a first transmission structure with one end connected with the first shaft and an opposite end connected with a second end of the first barrier plate. Driven by the first transmission structure, the first barrier plate rotates with the first shaft so as to move between the first position and the second position.

Further, the first transmission structure includes: a first positioning post on an outer peripheral surface of the first shaft; and a first connection line with one end connected with the first positioning post and an opposite end connected with the second end of the first barrier plate.

Further, the first transmission structure includes: a first positioning post on an outer peripheral surface of the first shaft; a first slide member movably on a sidewall of the first groove; wherein the second end of the first barrier plate is in a slide path of the first slide member; and a first connection line with one end connected with the first positioning post and an opposite end connected with the first slide member.

Further, the foldable display device further includes: a second barrier plate in the second groove; and a second movement structure configured to control movement of the second barrier plate between a third position and a fourth position; wherein the second barrier plate is located at the third position where an opening of the second groove is and the second barrier plate is in a same plane as the second closed surface when the first housing and the second housing are open; and wherein the second barrier plate is at the fourth position when the first housing and the second housing are closed, the fourth position is in a fourth portion in the second groove other than a third portion in the second groove, and the third portion is configured to accommodate the bendable region.

Further, the second movement structure includes: a third shaft at the opening of the second groove and at an end of the opening of the second groove away from the first shaft; wherein a first end of the second barrier plate is hinged on the third shaft; and a second transmission structure with one end connected with the first shaft and an opposite end connected with a second end of the second barrier plate;

wherein driven by the second transmission structure, the second barrier plate rotates with the first shaft so as to move between the third position and the fourth position.

Further, the second transmission structure includes: a second positioning post on an outer peripheral surface of the first shaft; and a second connection line with one end connected with the second positioning post and an opposite end connected with the second end of the second barrier plate.

Further, the second transmission structure includes: a second positioning post on an outer peripheral surface of the first shaft; a second slide member movably on a sidewall of the second groove; wherein the second end of the second barrier plate is in a slide path of the second slide member; and a second connection line with one end connected with the second positioning post and an opposite end connected with the second slide member.

According to the present disclosure, the presence of the accommodation space realizes bending of the display screen with a larger radius, thereby preventing the damage of the display screen.

DETAILED DESCRIPTION

Figure 1:
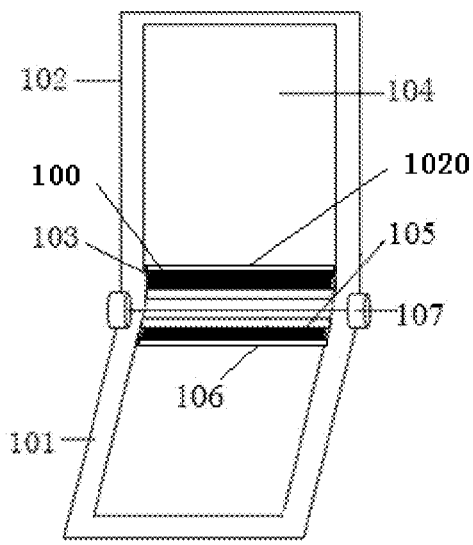
FIG. 1 illustrates a schematic view of a display device according to an embodiment of the present disclosure.

The features and principles of the present disclosure will be specifically described in conjunction with accompanying drawings. The illustrated embodiments are merely illustrative of the present disclosure and are not intended to limit the scope of the present disclosure.

As shown in FIGS. 1-5, the present disclosure provides a foldable display device which includes a first housing 101, a second housing 102 and a touch screen 104.

The first housing 101 and the second housing 102 are hinged by a first shaft 107. The first housing 101 and the second housing 102 include a first closed surface and a second closed surface, respectively. The first housing 101 and the second housing 102 may rotate about the first shaft 107 to be open or closed.

The touch screen 104 is covered on the first and second closed surfaces.

The touch screen 104 includes a bendable region 1040 corresponding to a connection region for the first housing 101 and second housing 102. The bendable region 1040 presents a planar structure when the first housing 101 and second housing 102 are open, and the bendable region 1040 presents a smooth curved structure when the first housing 101 and second housing 102 are closed.

A first groove is defined in an end of the first housing 101 adjacent to the second housing 102, and a second groove is defined in an end of the second housing 102 adjacent to the second housing 101. When the first housing 101 and second housing 102 are closed, the first and second grooves are aligned with each other and joined to define an accommodation space 103 for accommodating the bendable region 1040.

The touch screen 104 is folded as the first housing 101 and second housing 102 are closed. In order to avoid phenomena affecting the display effect such as creases when the touch screen 104 is expanded, the touch screen 104 includes the bendable region 1040 corresponding to the connection region for the first housing 101 and second housing 102. When the first housing 101 and second housing 102 are closed, the bendable region 1040 presents a smooth curved structure. The smaller the curvature radius of the curved structure is, the more easily the touch screen 104 is damaged, and the greater the curvature radius of the curved structure is, the longer the service life of the touch screen 104 is. The presence of the accommodation space 103 enables the bendable region 1040 to be bent at a large radius, thereby preventing damage to the screen and prolonging the service life of the screen.

The accommodation space 103 may have various specific structure forms, as long as the bendable region 1040 of the touch screen 104 may be accommodated in the folded state.

Optionally, the structure of the first groove and the structure of the second groove are symmetrical with respect to the first shaft 107.

Generally, a half of the touch screen 104 corresponds to the first housing 101, and the other half of the touch screen 104 corresponds to the second housing 102. Thus, the bendable region 1040 bends to form a smooth curved structure which is symmetrical with respect to the first shaft 107, when the touch screen 104 is folded as the first housing 101 and second housing 102 are closed. In the present embodiment, the accommodation space 103 is defined by aligning and joining the first and second grooves which are symmetrical to each other.

Figure 3:
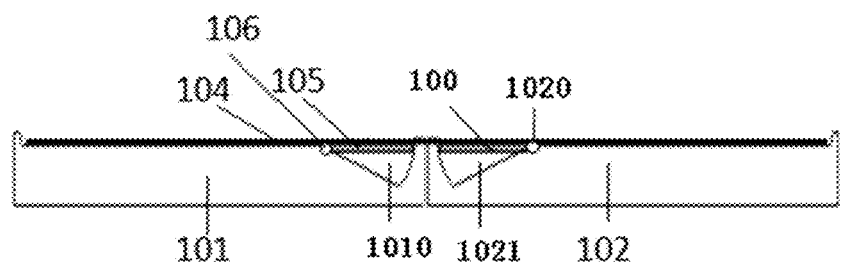
FIG. 3 illustrates a schematic view of an open state of a display device according to an embodiment of the present disclosure.
Figure 4:
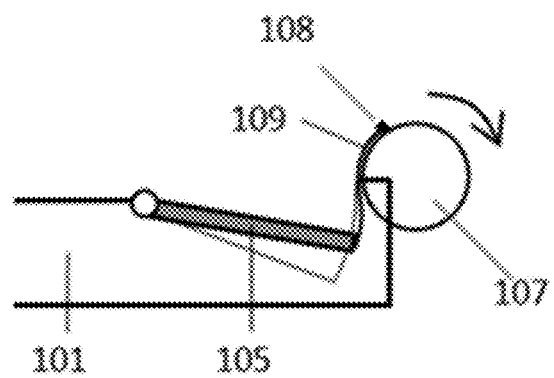
FIG. 4 illustrates a partial schematic view of a display device according to an embodiment of the present disclosure.
Figure 5:
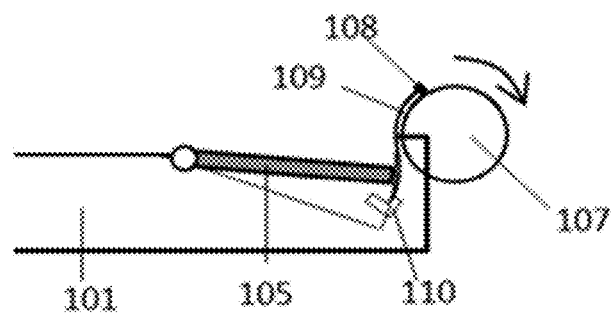
FIG. 5 illustrates a partial schematic view of a display device according to an embodiment of the present disclosure.

Optionally, as shown in FIGS. 3 to 5, the first groove id defined by a first sidewall adjacent to the first shaft 107 and a second sidewall. The first sidewall is a curved structure. The second sidewall defines an acute angle with respect to the first closed surface. A side of the second sidewall away from the first closed surface is connected to a bottom side of the first sidewall.

Figure 2:
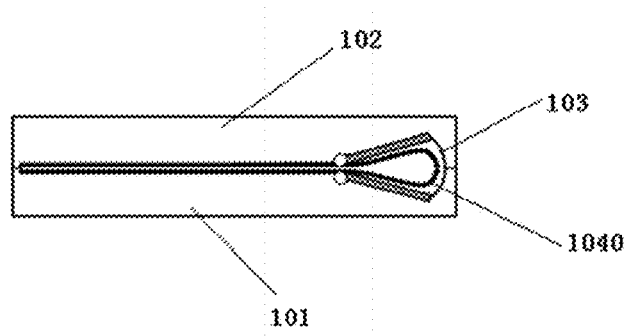
FIG. 2 illustrates a schematic view of a closed state of a display device according to an embodiment of the present disclosure.

The first groove is symmetrical with the second groove. The shape of the accommodation space 103 defined after the first and second grooves are aligned and joint, matches with the shape of the bended bendable region 1040, as shown in FIG. 2.

In order to effectively avoid the breakage of the touch screen 104, there is a gap between the sidewalls of the accommodation space 103 and the bendable region 1040.

Optionally, the foldable display device further includes a first barrier plate 105 arranged in the first groove; and a first movement structure controlling the movement of the first barrier plate 105 between a first position and a second position.

When the first housing 101 and second housing 102 are open, the first barrier plate 105 is located at the first position where an opening of the first groove is, and the first barrier plate 105 is in the same plane as the first closed surface, as shown in FIG. 3.

When the first housing 101 and second housing 102 are closed, the first barrier plate 105 is located at the second position which is in a second portion in the first groove other than a first portion in the first groove, and the first portion in the first groove is to accommodate the bendable region 1040, as shown in FIG. 4.

Since the touch screen 104 employs a flexible screen, when the first housing 101 and second housing 102 are open, the touch screen 104 is in a normal display state. Then, when touch operations are performed at positions corresponding to the accommodation space 103 on the touch screen 104, the touch screen 104 at these positions is prone to sag to cause deformation of the touch screen 104, affecting the display effect. The presence of the first barrier plate 105 can support the touch screen 104 when the first housing 101 and second housing 102 are open, thereby avoiding the deformation of the touch screen 104 at the positions corresponding to the accommodation space 103 due to operations such as touch.

When the first housing 101 and second housing 102 are closed, the first barrier plate 105 is located at a bottom of the first groove, i.e. the second portion other than the first portion accommodating the bendable region 1040. That is, the first barrier plate 105 does not affect the bending degree of the bendable region 1040.

The first movement structure may have various structure forms, as long as the movement of the first barrier plate 105 between the first position and the second position can be achieved. Optionally, in one embodiment, the first movement structure includes a second shaft 106 located at the opening of the first groove and at the end of the opening of the first groove away from the first shaft 107, and a first transmission structure with one end thereof connected with the first shaft 107. A first end of the first barrier plate 105 is hinged on the second shaft 106. The other end of the first transmission structure is connected with a second end of the first barrier plate 105. Driven by the first transmission structure, the first barrier plate 105 rotates with the first shaft 107 so as to move between the first position and the second position.

Further, as shown in FIG. 4, the first transmission structure includes: a first positioning post 108 on an outer peripheral surface of the first shaft 107 and a first connection line 109. An end of the first connection line 109 is connected with the first positioning post 108, and the other end of the first connection line 109 is connected with the second end of the first barrier plate 105.

Since the first sidewall of the first groove is a curved structure and the second sidewall is an inclined structure as well as one end of the first barrier plate 105 is hinged on the second sidewall at the opening of the first groove, thus the other end of the first barrier plate 105 is a free end and is movable in the first groove. When the first housing 101 and the second housing 102 are open, the first shaft 107 rotates and the first transmission structure may be moved by the rotation of the first shaft 107 so as to move the first barrier plate 105 to the first position which is in the same plane as the first closed surface. When the first housing 101 and the second housing 102 are closed, the first rotating shaft 107 rotates in the reverse direction, the first connection line 109 is slack, and the free end of the first barrier plate 105 is in free fall to the second position.

In order to effectively avoid the deformation of the touch screen 104, a length of the first barrier plate 105 may be such that the first barrier plate 105 can close the opening of the first groove when the first barrier plate 105 is in the first position, that is, the free end of the first barrier plate 105 may abut the first sidewall and the first barrier plate 105 may slide along the first sidewall.

As shown in FIG. 5, in some embodiments of the present application, the first transmission structure includes: a first positioning post 108 on the outer peripheral surface of the first shaft 107, a first slide member movably provided on the sidewall of the first groove, and a first connection line 109. The second end of the first barrier plate 105 is located in the slide path of the first slide member 110. An end of the first connection line 109 is connected with the first positioning post 108, and the other end of the first connection line 109 is connected with the first slide member 110.

Optionally, the foldable display device may further include: a second barrier plate 100 disposed in the second groove; and a second movement structure for controlling the movement of the second barrier plate 100 between a third position and a fourth position.

When the first housing 101 and second housing 102 are open, the second barrier plate 100 is located at the third position where an opening of the second groove is, and the second barrier plate 100 is in the same plane as the second closed surface.

When the first housing 101 and second housing 102 are closed, the second barrier plate 100 is located at the fourth position which is a fourth portion in the second groove other than a third portion in the second groove, and the third portion in the second groove is to accommodate the bendable region 1040.

Since the touch screen 104 employs a flexible screen, when the first housing 101 and second housing 102 are open, the touch screen 104 is in a normal display state. When touch operations are performed at positions on the touch screen 104 corresponding to the accommodation space 103, the touch screen 104 at these positions is prone to sag to cause deformation of the touch screen 104, affecting the display effect. The presence of the second barrier plate 100 can support the touch screen 104 when the first housing 101 and second housing 102 are open, avoiding the deformation of the touch screen 104 at the positions corresponding to the accommodation space 103 due to operations such as touch.

When the first housing 101 and second housing 102 are closed, the second barrier plate 100 is located at a bottom of the second groove, i.e. the fourth portion other than the third portion accommodating the bendable region 1040. That is, the second barrier plate 100 does not affect the bending degree of the bendable region 1040.

Further, the second movement structure includes a third shaft 1020 located at the opening of the second groove and at the end of the opening of the second groove away from the first shaft 107, and a second transmission structure with one end thereof connected with the first shaft 107. A third end of the second barrier plate 100 is hinged on the third shaft 1020. The other end of the second transmission structure is connected with a fourth end of the second barrier plate 100. Driven by the second transmission structure, the second barrier plate 100 rotates with the first shaft 107 so as to move between the third position and the fourth position.

Further, the second transmission structure includes: a second positioning post provided on the outer peripheral surface of the first shaft 107 and a second connection line. An end of the second connection line is connected with the second positioning post, and the other end of the second connection line is connected with the fourth end of the second barrier plate 100.

Since a third sidewall of the second groove is a curved structure and the fourth sidewall is an inclined structure as well as one end of the second barrier plate 100 is hinged on the fourth sidewall at the opening of the second groove, thus the other end of the second barrier plate 100 is a free end and is movable in the second groove. When the first housing 101 and the second housing 102 are open, the first shaft 107 rotates and the second transmission structure may be moved by the rotation of the first shaft 107 so as to move the second barrier plate 100 to the third position which is in the same plane as the second closed surface. When the first housing 101 and the second housing 102 are closed, the first rotating shaft 107 rotates in the reverse direction, the second connection line is slack, and the free end of the second barrier plate 100 is in free fall to the fourth position.

In order to effectively avoid the deformation of the touch screen 104, a length of the second barrier plate 100 may be such that the second barrier plate 100 can close the opening of the second groove when the second barrier plate 100 is in the third position, that is, the free end of the second barrier plate 100 may abut the third sidewall and the second barrier plate 100 may slide along the third sidewall.

Further, the second transmission structure includes: a second positioning post provided on the outer peripheral surface of the first shaft 107, a second slide member movably provided on the sidewall of the second groove, and a second connection line. The fourth end of the second barrier plate 100 is located in the slide path of the second slide member. An end of the second connection line is connected with the second positioning post, and the other end of the second connection line is connected with the second slide member.

In some embodiments, the second transmission structure is the same as the first transmission structure. Thus, the specific structure of the second transmission structure may refer to the first transmission structure in FIGS. 3-5.

The above are merely the optional embodiments of the present disclosure. It should be noted that one skilled in the art may make further modifications and improvements without departing from the principle of the present disclosure, and these modifications and improvements shall also fall within the scope of the present disclosure.

What is claimed is:

1. A foldable display device, comprising:
    a first housing and a second housing which is hinged to the first housing with a first shaft; wherein the first housing has a first closed surface and the second housing has a second closed surface; and the first housing and the second housing is capable of rotating about the first shaft to be open or closed; and
    a touch screen covering the first closed surface and the second closed surface;
    wherein the touch screen has a bendable region corresponding to a connection region for the first housing and the second housing; the bendable region presents a planar structure when the first housing and the second housing are open and presents a smooth curved structure when the first housing and the second housing are closed;
    wherein a first groove is defined in an end of the first housing neighboring the second housing, a second groove is defined in an end of the second housing neighboring the first housing, and the first groove and the second groove are aligned and joint to define an accommodation space for accommodating the bendable region;
    wherein the foldable display device further comprises:
        a first barrier plate in the first groove; and
        a first movement structure configured to control movement of the first barrier plate between a first position and a second position;
        wherein the first barrier plate is at the first position where an opening of the first groove is and the first barrier plate is in a same plane as the first closed surface, when the first housing and the second housing are open; and
        wherein the first barrier plate is at the second position when the first housing and the second housing are closed, the second position is in a second portion other than a first portion in the first groove, and the first portion in the first groove is configured to accommodate the bendable region;
    wherein the first movement structure comprises:
        a second shaft at the opening of the first groove and at an end of the opening away from the first shaft wherein a first end of the first barrier plate is hinged on the second shaft; and
        a first transmission structure with one end connected with the first shaft and an opposite end connected with a second end of the first barrier plate;
        wherein driven by the first transmission structure, the first barrier plate rotates with the first shaft so as to move between the first position and the second position;
    wherein the first transmission structure comprises:
        a first positioning post on an outer peripheral surface of the first shaft and
        a first connection line with one end connected with the first positioning post and an opposite end connected with the second end of the first barrier plate.

2. The foldable display device according to claim 1, wherein a structure of the first groove and a structure of the second groove are symmetrical with respect to the first shaft.

3. The foldable display device according to claim 2, wherein the first groove is defined by:
    a first sidewall, neighboring the first shaft and having a curved structure; and
    a second sidewall, defining an acute angle with respect to the first closed surface and having a side away from the first closed surface being connected to a bottom side of the first sidewall.

4. The foldable display device according to claim 1, further comprising:
    a second barrier plate in the second groove; and
    a second movement structure configured to control movement of the second barrier plate between a third position and a fourth position;
    wherein the second barrier plate is at the third position where an opening of the second groove is and the second barrier plate is in a same plane as the second closed surface when the first housing and the second housing are open; and
    wherein the second barrier plate is at the fourth position when the first housing and the second housing are closed, the fourth position is in a fourth portion in the second groove other than a third portion in the second groove, and the third portion in the second groove is configured to accommodate the bendable region.

5. The foldable display device according to claim 4, wherein the second movement structure comprises:
    a third shaft at the opening of the second groove and at an end of the opening of the second groove away from the first shaft; wherein a first end of the second barrier plate is hinged on the third shaft; and
    a second transmission structure with one end connected with the first shaft and an opposite end connected with a second end of the second barrier plate;

wherein driven by the second transmission structure, the second barrier plate rotates with the first shaft so as to move between the third position and the fourth position.

6. The foldable display device according to claim 5, wherein the second transmission structure comprises:
   a second positioning post on an outer peripheral surface of the first shaft; and
   a second connection line with one end connected with the second positioning post and an opposite end connected with the second end of the second barrier plate.

7. The foldable display device according to claim 6, wherein the second connection line is a thread.

8. The foldable display device according to claim 5, wherein the second transmission structure comprises:
   a second positioning post on an outer peripheral surface of the first shaft;
   a second slide member movably on a sidewall of the second groove; wherein the second end of the second barrier plate is in a slide path of the second slide member; and
   a second connection line with an end connected with the second positioning post and an opposite end connected with the second slide member.

9. The foldable display device according to claim 8, wherein the second connection line is a thread.

10. The foldable display device according to claim 1, wherein the first connection line is a thread.

11. A foldable display device, comprising:
    a first housing and a second housing which is hinged to the first housing with a first shaft; wherein the first housing has a first closed surface and the second housing has a second closed surface; and the first housing and the second housing is capable of rotating about the first shaft to be open or closed; and
    a touch screen covering the first closed surface and the second closed surface;
    wherein the touch screen has a bendable region corresponding to a connection region for the first housing and the second housing; the bendable region presents a planar structure when the first housing and the second housing are open and presents a smooth curved structure when the first housing and the second housing are closed;
    wherein a first groove is defined in an end of the first housing neighboring the second housing, a second groove is defined in an end of the second housing neighboring the first housing, and the first groove and the second groove are aligned and joint to define an accommodation space for accommodating the bendable region;
    wherein the foldable display device further comprises:
    a first barrier plate in the first groove; and
    a first movement structure configured to control movement of the first barrier plate between a first position and a second position;
    wherein the first barrier plate is at the first position where an opening of the first groove is and the first barrier plate is in a same plane as the first closed surface, when the first housing and the second housing are open; and
    wherein the first barrier plate is at the second position when the first housing and the second housing are closed, the second position is in a second portion other than a first portion in the first groove, and the first portion in the first groove is configured to accommodate the bendable region;
    wherein the first movement structure comprises:
    a second shaft at the opening of the first groove and at an end of the opening away from the first shaft; wherein a first end of the first barrier plate is hinged on the second shaft; and
    a first transmission structure with one end connected with the first shaft and an opposite end connected with a second end of the first barrier plate;
    wherein driven by the first transmission structure, the first barrier plate rotates with the first shaft so as to move between the first position and the second position;
    wherein the first transmission structure comprises:
    a first positioning post on an outer peripheral surface of the first shaft;
    a first slide member movably on a sidewall of the first groove; wherein the second end of the first barrier plate is in a slide path of the first slide member; and
    a first connection line with one end connected with the first positioning post and an opposite end connected with the first slide member.

12. The foldable display device according to claim 11, wherein the first connection line is a thread.

* * * * *